United States Patent [19]

Kasper

[11] E Re. 29,957

[45] Reissued Apr. 10, 1979

[54] POWERED ROTARY BRUSH

[75] Inventor: Joseph G. Kasper, Minneapolis, Minn.

[73] Assignee: Tennant Company, Minneapolis, Minn.

[21] Appl. No.: 750,656

[22] Filed: Dec. 15, 1976

Related U.S. Patent Documents

Reissue of:

[64] Patent No.: 3,113,332
Issued: Dec. 10, 1963
Appl. No.: 205,243
Filed: Jun. 26, 1962

[51] Int. Cl.[2] ..... E01H 1/04
[52] U.S. Cl. ..... 15/83
[58] Field of Search ..... 15/78, 82-87, 15/340, 377, 375, 387, 389; 60/DIG. 10; 180/66 F

[56] References Cited

U.S. PATENT DOCUMENTS

| | | | |
|---|---|---|---|
| 1,953,340 | 4/1934 | Doemling | 15/389 |
| 2,534,969 | 12/1950 | Hauser | 15/82 X |
| 2,673,997 | 4/1954 | Richey et al. | 15/82 |
| 2,711,551 | 6/1955 | Wagner et al. | 15/82 |
| 2,829,391 | 4/1958 | Swanson et al. | 15/83 |
| 2,917,761 | 12/1959 | Burgdorff | 15/84 |

FOREIGN PATENT DOCUMENTS

| | | | |
|---|---|---|---|
| 1145123 | 10/1957 | France. | |
| 1263379 | 5/1961 | France | 180/66 F |

*Primary Examiner*—Edward L. Roberts
*Attorney, Agent, or Firm*—Norman P. Friedrichs

[57] ABSTRACT

*A sweeping machine having a frame, a pair of support members, and means for mounting the support members on the frame. A brush is rotatably mounted between the support members. A drive mechanism for the brush includes a source of power in a form capable of being transmitted by conduit means and a motor attached to one of the support members and being located substantially within an interior chamber defined by the brush and with the motor being capable of utilizing power from the source to rotate the brush.*

12 Claims, 10 Drawing Figures

INVENTOR.
JOSEPH G. KASPER

BY
Dugger, Bradbell, Johnson & Westman

ATTORNEYS

INVENTOR.
JOSEPH G. KASPER

BY
Dugger, Bradbell, Johnson & Whitman

ATTORNEYS

INVENTOR.
JOSEPH G. KASPER

BY
Dugger, Braddock, Johnson & Westman

ATTORNEYS

POWERED ROTARY BRUSH

Matter enclosed in heavy brackets [ ] appears in the original patent but forms no part of this reissue specification; matter printed in italics indicates the additions made by reissue.

This invention relates to powered rotary brushes and more particularly to a rotary brush wherein the drive unit for powering the brush is contained inside the brush dimensions so that no external rotating drive members are present.

Presently, in general practice, cylindrical brushes and similar cylindrically shaped implements used for power driven sweeping and maintenance equipment are mounted on an axial shaft or stub shafts driven through suitable chain and sprocket or similar arrangements from a source of power remote from or external to the brush itself. Such drive arrangements cause many problems in operation due to foreign material getting into the drive, as well as requiring unnecessarily heavy structural components for holding the drives, increased difficulty in maintenance and changing or brush or other implement, and other technical and functional difficulties. Increased overall width of machines using conventional drives is also a problem where compactness is important, as in a street sweeping machine.

In order to overcome the problems involved with using external drive members as well as to provide for complete interchangeability of brushes or other implements, various devices have been advanced, none of which have proved entirely satisfactory.

The invention is specifically illustrated with reference to a tubular brush such as disclosed in Pat. No. 2,879,534, having a tubular core and bristles of various materials for sweeping polishing, scouring, etc. Insofar as concerns the present invention, the working implement may be any tool of similar general configuration having a tubular core on the periphery of which there is attached working elements which operate in a cylindrical path. Therefore in this specification the word "implement" will be used and will be understood to be inclusive of brushes, fans, abrading tools, etc. having a tubular center and an exterior working element.

The device disclosed in the present invention includes a completely enclosed rotating implement wherein the drive for the implement is a hydraulic motor and system, the motor being positioned partially or entirely within a tubular core member of the implement. There are no external drive parts used in connection with this device.

The tubular core of the implement has end flanges fixedly mounted to the core. A first of the end flanges, which is on the idler end of the implement, is positioned at or near the end of the tubular core and is rotatably mounted with respect to a support arm or other frame which in turn is mounted on the machine propelling the implement. Adjacent the other end of the implement, which is the drive end, and inside a tubular core thereof, a second end flange is fastened and it is spaced inwardly from the end of the core. An "L-shaped" support arm or frame piece is mounted on the machine propelling the implement and one leg of the L extends into the interior of the tubular core. A hydraulic motor having a powered output shaft is fixedly attached to the leg of the support arm adjacent the second end flange of the implement. The hydraulic motor has a rotatable powered output shaft which in turn is drivably connected to the second end flange. The hydraulic motor is powered by fluid under pressure conducted through lines which, as disclosed, may be comprised as passageways within the L-shaped support arm itself or sturdy exterior lines mounted thereon. When the hydraulic motor is powered the implement is rotated for use. The only power connections from the brush to the machine propelling it are the two hydraulic conduits.

The implement can be mounted on any type of support mechanism. In the following specification two variations of support mechanisms are shown, one wherein the implement is a brush and is enclosed within the frame of the vehicle propelling it and the other wherein the implement is a heavy brush mounted ahead of the vehicle so that it can be used for windrowing swept material, such as dirt, debris, snow, etc. In either case, the power connections from the vehicle to the implement are composed solely by hydraulic conduits and the entire drive mechanism per se is contained within the core of the implement. This eliminates troublesome chain, gear or V-belt drives and reduces maintenance costs as well as making the whole device rugged, compact and its appearance more appealing.

While this invention is specifically illustrated with reference to a power driven brushing or sweeping machine, it is to be understood that the invention is not limited thereby and, as hereinbefore mentioned, the invention may be employed with equal advantages whereover a tubular cylindrical power driven implement is employed.

It is an object of the present invention to present a rotating tubular member having a self-contained power unit;

It is another object of the present invention to present a rotary tubular implement utilizing a self-contained hydraulic motor for a powering member.

It is a still further object of the present invention to present a power driven rotary implement wherein there are no external rotating drive members and the implement is driven directly by a hydraulic motor without external speed reduction mechanism.

Other and further objects are those inherent in the invention herein illustrated, described and claimed, and will be apparent as the description proceeds.

To the accomplishment of the foregoing and related ends, this invention then comprises the features hereinafter fully described and particularly pointed out in the claims, the following descriptions setting forth in detail certain illustrative embodiments of the invention, these being indicative, however, of but a few of the various ways in which the principles of the invention may be employed.

The invention is illustrated with reference to the drawings wherein.

Figure 10:
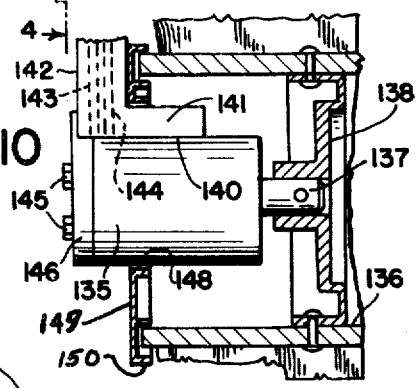
Figure 9:
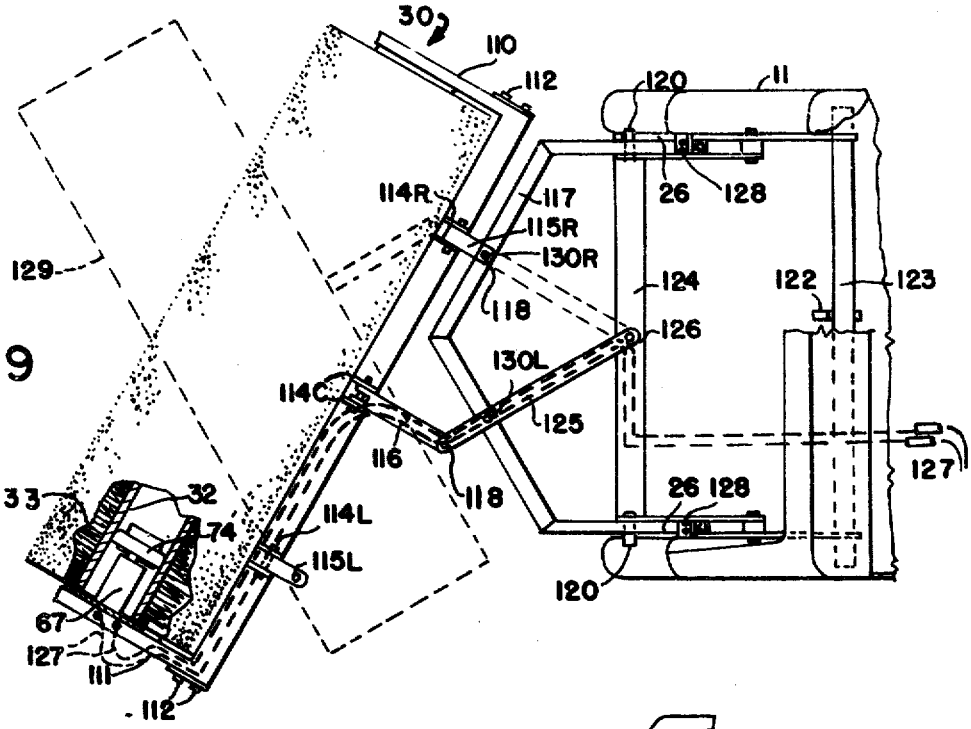
Figure 8:
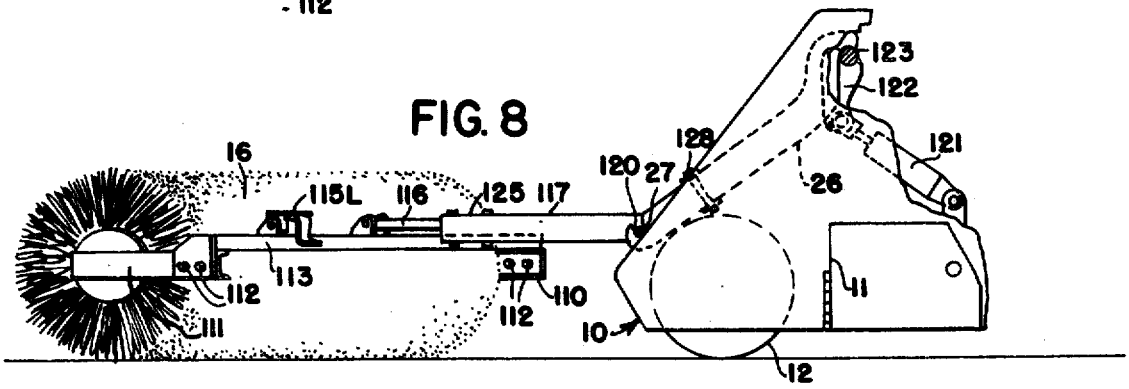
Figure 7:
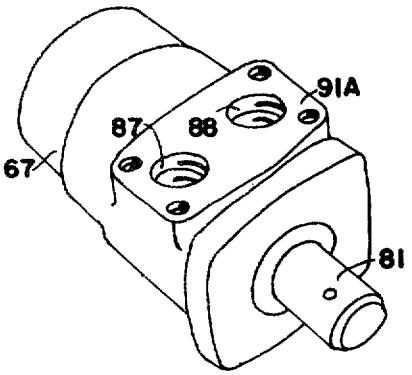
FIG. 7 is a perspective view of an exemplary form of a hydraulic motor used to power a rotary implement made according to the present invention.
Figure 6:
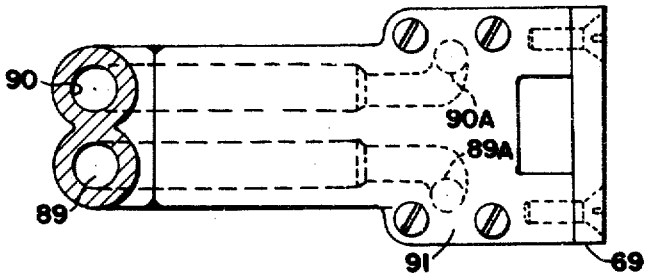
FIG. 6 is an enlarged sectional view taken as on line 6—6 in FIG. 3 showing the unitary support arm and self contained conduits to mount the hydraulic motor and supply hydraulic fluid under pressure to the hydraulic motor used to drive the rotating implement.

FIGS. 8 and 9 illustrate a rotary brush mounted on a sweeping machine according to another embodiment of the present invention, FIG. 8 being a fragmentary side elevational view thereof and FIG. 9 a top plan view of the device of FIG. 8; and FIG. 10 is a vertical sectional view of a rotary implement showing a modified mounting for a hydraulic drive motor wherein the motor is partially positioned within the tubular member.

A power driven sweeper illustrated generally at 10 includes a lower main frame member 11 that is mounted on rotatable spaced front support idler wheels 12 and rear drive and steering wheel or wheels 13. An engine is mounted under a sheet metal hool 14 and serves to power the vehicle and supply power to operate the various sweeping brushes and accessories. A front curb or gathering brush 15 is drivably rotatably mounted at the front of the machine and a main (cylindrical) center brush 16 is rotatably mounted with its axis transverse to the normal path of motion of the machine, at a central location beneath the frame of the machine, in this illustrated embodiment.

This invention pertains to the main cylindrical brush 16, which is the implement illustrated. This center brush 16 is mounted within a housing 17 and a door 20 (and a similar door on the opposite side) opens through frame 11 to the housing 17 to provide access to the brush. A flexible skirt 21 is mounted around the lower edge of housing 17 and travels in close proximity to a surface 22 to be swept. The brush 16 is rotated in direction as indicated by arrow 23 and dirt and foreign objects on the surface 22 are swept into a pan 24 positioned ahead of the rotary brush. The front housing 25 of the street sweeping machine houses a filter (not shown), for separating the dust from the air flowing through the housing. In the machine illustrated, the upper surface of the filter (not shown) is covered by a suitable plenum chamber which is maintained at a negative pressure by suitable vacuum blower equipment, as illustrated in the copending application of Ralph C. Peabody and Keith N. Krier Ser. No. 137,864, filed Sept. 13, 1961. Air flow thus induced causes dust to be drawn from housing 17 along with the swept dirt. The pan 24 retains the larger dirt particles swept up and dust shaken from the filters is also caught in the pan 24. The front housing 25 (including pan 24) is removable from the main frame 11 of the street sweeping machine. This is accomplished by mounting it on a pair of arms 26, 26 each of which has a socket or notch 27 provided therein. The arms 26, 26 swing up about pivot axis 123 under power to raise or lower the pan 24 and housing 25 and can be used for mounting other devices to provide multiple uses of the sweeping machine, if desired.

Figure 3:
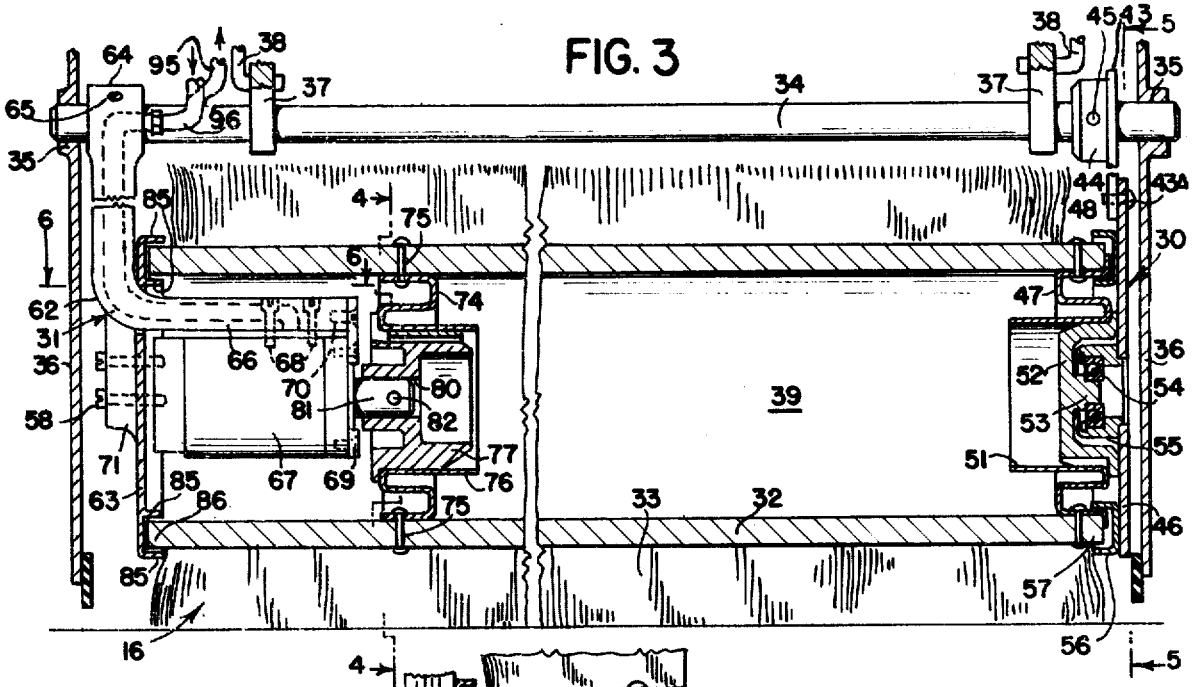
FIG. 3 is a sectional view taken as on line 3—3 in FIG. 2.

The rotary brush 16 is mounted transverse to the direction of movement of the sweeping machine and is best seen in FIG. 3.

The rotary brush 16 is mounted between an idler end support assembly generally designated 30 and a drive end support assembly generally designated 31. As can be seen in FIG. 3, the brush 16 is comprised of a tubular core member 32 having bristles 33 fixedly attached thereto around the outer periphery thereof. This form of brush construction is fully described in Pat. No. 2,879,534. The tubular core 32 is hollow at 39, and, according to this invention this space is used for locating the hydraulic drive motor. The drive end support assembly 31 and the idler end support assembly 30 are, in effect, arms which are mounted on a common pivot shaft 34 that in turn is rotatably mounted in suitable bearings 35, 35 which are fixed to frame side plates 36, 36 of the sweeping machine 10. A pair of lift arms 37, 37 are fixedly attached to the pivot shaft 34. The lift arms 37, 37 are controlled through a pair of lift rods 38, 38 that in turn are movable in directions as indicated by double arrow 42 through power mechanisms (not shown) on the sweeping machine for swinging arms 30 and 31 to thus raise and lower the axis of brush 16.

Figure 2:
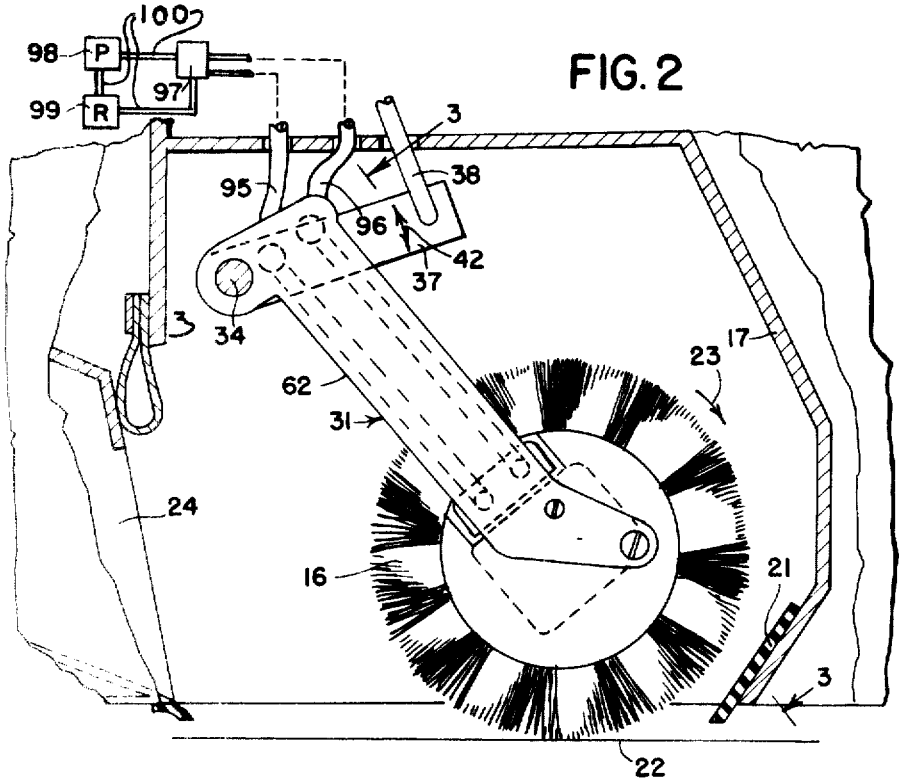
FIG. 2 is a fragmentary enlarged side elevational view of a power driven rotary brush mounted on the street sweeping machine shown in FIG. 1 with parts in section and parts broken away to show the drive mechanism of the rotary brush.

It will be seen in FIG. 2 that the pivot shaft 34 for the end members of the roller is mounted forwardly from the axis of rotation of the brush 16.

Figure 5:
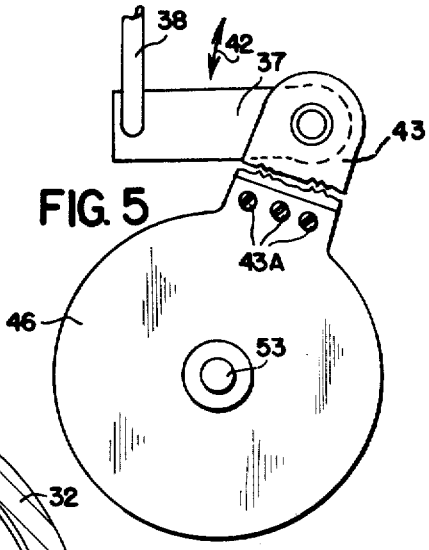
FIG. 5 is an end elevational view of an end support member of the device of the invention taken as on line 5—5 in FIG. 3.
Figure 4:
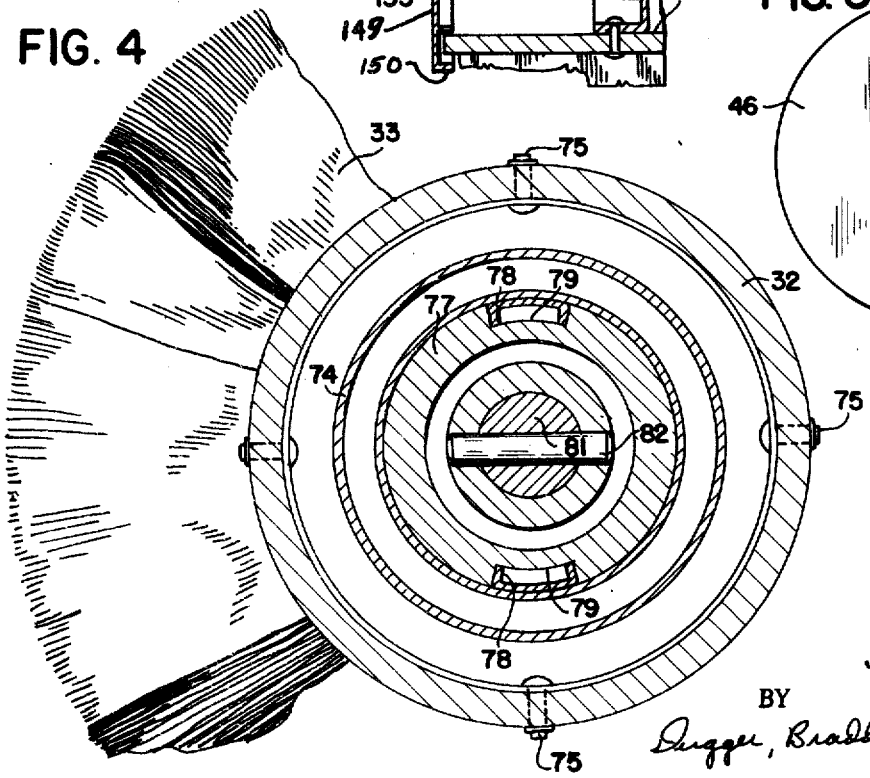
FIG. 4 is a sectional view taken as on line 4—4 in FIG. 3.

The idler end support assembly 30 includes an arm assembly 43 that has an integral hub 44 that is pinned at 45 on the shaft 34. As shown in FIG. 5, arm assembly 43 includes a detachably secured disc-shaped shield member 46 which is held in place by screws 43A which are accessible through door 20. The rotary brush 16 is journalled on the axis of this disc-shaped member 46.

A flange or metal stamping 47 shaped as shown in FIG. 3 fits into the end of the tube 32. This flange 47 is fastened to the core 32 with a plurality of rivets 48. The flange includes an integral tubular hub 51 that is concentric with the axis of rotation of the rotary brush.

A wheel like member 52 has an easy slip fit into hub and supports the hub 51 and hence brush 16. The wheel member 52 includes an integral stub shaft 53 that extends into a bearing 54 which in turn is mounted in a bearing housing 55 that is made integral with the disc member 46 of the arm 43. The wheel member 52 is made so that the outer peripheral portions thereof are concentric with and overlap the bearing housing 55 in order to save space in the mounting assembly and also shield the bearing. Thus the brush is mounted by idler stub shaft 53 turning in the bearing 54 and brush 16 rotates about the axis of the stub shaft 55.

An annular ring or shield 55, which is channel-shaped in cross section, as best seen in FIG. 3, is fixedly attached to the disc-like member 46 of the arm 43. The outer flange of the annular ring 56 overlaps the outer edge portions 57 of the tubular core 32 of the rotary brush and the inner flange extends into that part of the flange 47 which fits the inner surface of tube 32. As the core 32 rotates, the ring remains stationary and helps to prevent foreign material from entering the region of the bearing 54 and damaging the moving parts.

The driven-end support assembly 31 of the rotary brush includes an L-shaped arm 62 having a spur 71 on which is mounted a disc-shaped member 63 which covers the end of tube 32. This member 63 is of substantially the same outer diameter as the tubular core 32 of the rotary brush, is transverse to the axis thereof and is held in place by bolts 58. Arm 66 extends through a hole in disc 63. Disc 63 has two concentric flanges 85 which fit close to but clear the marginal inner and outer edges of tube 32, much like the flanges on ring 56 at the opposite end of tube 42. These prevent entry of undue amounts of dust, dirt, string, etc. into tube 32.

The arm 62 has an integral hub 64 that is fastened on shaft 34 by pin 65. A leg member 66 on the L-shaped arm extends through disc 63 into the interior chamber 39 of tubular core member 32. Leg 66 is substantially parallel to the longitudinal axis of tube 32 but is offset from the center.

A hydraulic motor 67 is fastened to the leg 66 with a plurality of screws 68 and with a motor retainer plate 69 that is fastened to the motor and to the leg 66 with screws 70.

An internal flange 74 is shaped as shown in FIG. 3 is slipped inside the tubular core 32 and fastened to the wall of the core with rivets 75. The internal flange 74 is the drive flange for the brush. The flange 74 has an integral hub 76 that is concentric with the hub 51 of the idler flange and concentric with tube 32. An internal drive member 77 has an easy slip fit within hub 76 and is driven through suitable drive keys 78 that are fixedly attached to the interior surfaces of hub 76 and fit in grooves 79 provided in drive member 77.

The drive member 77 is provided with a bore 80 that receives motor output drive shaft 81 to which it is pinned at 82. Thus whenever the motor output shaft 81 is rotating under power the drive member 77 rotates and consequently flange 74 and the rotary brush 16 will also be rotated.

The flanges 85, which are fixed to disc-shaped member 63 overlap end portion 86 of the drive end of the tubular core member 32 and, as does ring 56 on the idler end of the brush, prevent entry of dirt and foreign material into the interior chamber of the tubular core 32. Thus the rotary brush is mounted so that it is rotatable with respect to the drive end support assembly 31 and the idler end support assembly 30. The idler end of brush is rotatably mounted in bearing 54 and the drive end is mounted on and rotatably carried by the hydraulic motor output shaft 81. The axis of the motor shaft and the center line of the bearing are concentric.

The motor 67 is a hydraulic motor of known design and has an inlet opening 87 and an outlet opening 88. The inlet opening 87 and outlet opening 83 are positioned to align with the ends 89A of an inlet conduit 89 and end 90A of outlet conduit 90, respectively. These conduits are provided by passageways in the L-shaped arm 62. The leg 66 of arm 62 has a manifold platform 91 that aligns with a flat manifold 91A on the hydraulic motor 67 and it is through these manifold portions that the connection between the conduits in leg 66 and the inlet and outlet openings 87 and 88 respectively of the motor is accomplished. Suitable sealing means (not shown) are provided to prevent leakage of hydraulic fluid.

The inlet and outlet conduits 89 and 90, respectively, are connected to a suitable flexible inlet hose 96 and an outlet hose 95 which in turn pass through openings in housing 17 and are connected to a valve 97. The valve 97 receives fluid under pressure from a pump 98 which draws hydraulic fluid from reservoir 99. The pump 98 is capable of delivering a sufficient volume of fluid at a high enough pressure to operate motor 67 effectively. A reservoir 99 is also provided to receive returned hydraulic fluid. The pump, valve and reservoir are connected together with suitable conduits 100 as shown schematically in FIG. 2.

In order to operate the brush, the valve 97 is moved to position to direct fluid under pressure from pump 98 through inlet hose 96 and thus through conduit 89 and into inlet opening 87 of the motor. The motor then drives output shaft 81 which in turn drives through drive member 77 and flange 74 to the tubular core member 32 of the rotary brush. Fluid will be exhausted out through the opposite motor opening and outlet conduits. The brush will be rotated in direction as indicated by arrow 23 and will sweep debris and dirt from surface 22 into the pan 24. If the motor or the brush is to be stopped, the valve is returned to a "neutral" position wherein fluid from the pump is recirculated directly to a reservoir 99 and the motor 67 will stop. The device can be reversed by reversing the direction of flow of the fluid under pressure, if desired.

The rotary brush can be raised and lowered very easily by suitable mechanism operating lift rods 38 and arms 37. There is no need to provide for change of chain length or other problems encountered when mechanical drives are employed. The self-contained drive unit makes the rotary brush simple to operate and prevents damage to the drive components, as the components are within the interior chamber 39 of tubular core 32. The components are also protected from dirt and dust as the slinger rings provide an adequate seal to prevent introduction of foreign material. The unit is compact in design and thus highly maneuverable, particularly in narrow places.

A second embodiment of the invention is illustrated in FIGS. 8 and 9. In this form of the invention the rotary brush is mounted ahead of the sweeping machine and can easily be attached and removed for use in special jobs such as windrowing dirt, debris and snow. There are no chains or other moving drive members that have to be connected. It should be noted that parts identical with parts in the first form of the invention will be identically numbered.

In this embodiment of the invention also, a rotary brush 16 includes a tubular core member 32 with bristles 33 mounted thereon. A hydraulic motor 67 is positioned to drive the drive flange 74 in the same manner as in the previous form of the invention. The idler end assembly 30 is substantially the same as in the first form of the invention with the exception that an arm 110 is utilized which is removably attached by bolts 112 to a cross frame 113.

On the drive end of the brush an arm 111 is utilized which is also fastened with suitable bolts 112 to a cross frame 113. Cross frame 113 is positioned behind the brush 116 and extends parallel to the brush. Three pairs of ears 114L, 114C and 114R are fixedly attached to the top surface of cross frame 113 and all are apertured along a common axis. These ears are utilized (the center pair and either end pair), two at a time, to hold the cross frame 113. A pair of short connector links 115L and 115R are pivotally mounted on the common aperture axis and attached to the two outer parts of ears 114L or 114R. A long connector link 116 is pivotally mounted also on the common axis and attached to the center pair of ears 114C.

Figure 1:
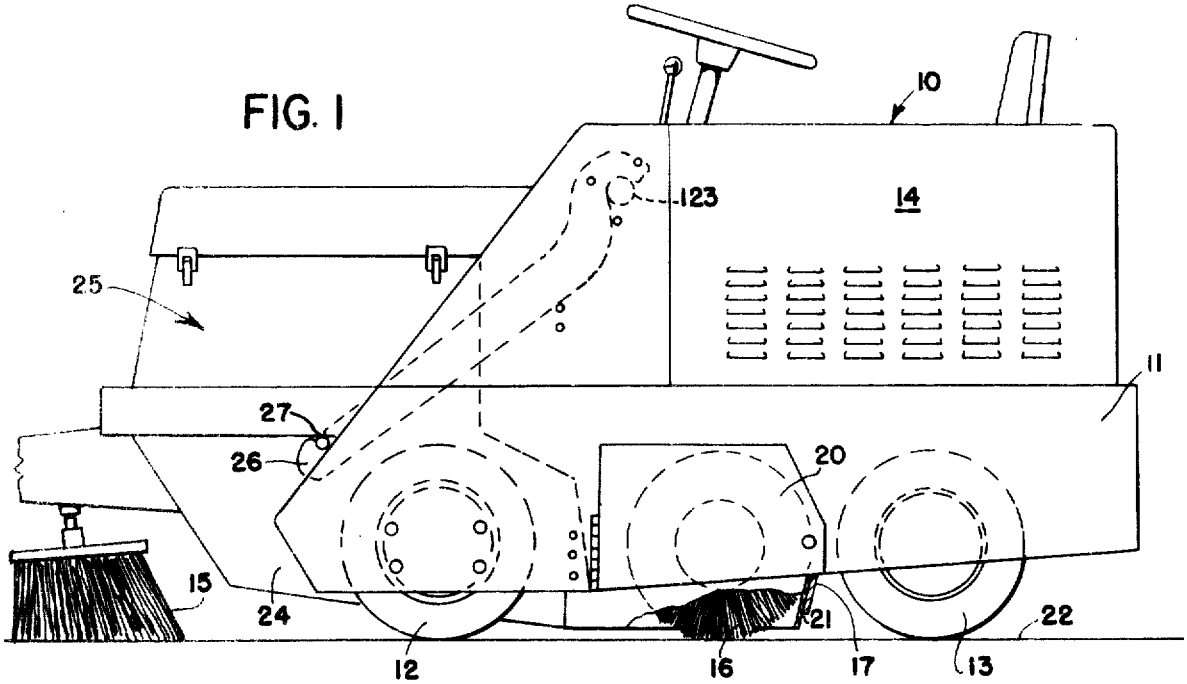
FIG. 1 is a side elevational view of a power driven street sweeping machine having a rotary brush made according to the present invention installed thereon.

The long connector link 116, in the center, and one short connector at either end are attached to a suitable pusher frame assembly 117-125-124 with pins 118. The pusher frame assembly 117-125-124 has a pair of integral stub lift pins 120, 120 that are adapted to fit into notches 27 of the forward arms 26 of the street sweeping machine 10. The arms 26 are adapted to be swung up and down through the instrumentality of hydraulic cylinder 121 on the machine that can be caused to exert a force on a lever 122 and rotate a rock shaft 123, on which the arms 26 are mounted. The rock shaft is rotatably mounted with respect to the sweeping machine 10. Thus the arms which can be raised or lowered to dump pan 24 (FIG. 1) can also be raised or lowered to pick up an object, such as the pusher frame assembly 117 or to adjust the height thereof, and the machine 10 therefore has much versatility.

It should be noted that the pusher frame assembly includes a cross member 124 to which a swinging support arm 125 is pivotally mounted, as at 126. The long connector link 116 is pivoted on the end of arm 125 by pin 118. The short connector links 115L or 115R at either the left or right end of cross member 113 can be attached to frame 117. The swinging support arm 125 can be moved from position as shown in FIG. 9 toward the opposite side of the pusher frame and secured at either position by a drop pin at position 130L or 130R. In either position the whole brush 16 and cross frame 113 can be swung on pivot 118 to bring the other short link 115L or 115R to registry with frame 117. In FIG. 9 the short connector link 115R at the right end of the cross member 113 is attached to frame 117 by pin 130R and the angle of the rotary brush is set to sweep to the right. This can be changed to the position as shown in dotted lines at 129 in FIG. 9 by changing the position of the arm 125 and securing it at pin 130R and by then swinging brush 16 and frame 113 to bring link 115L to a position to register with pin 130L where it is secured.

In order to drive the rotary brush in its position as shown in FIGS. 8 and 9 it is only necessary to connect two hydraulic lines 127, 127 leading to the hydraulic motor 67. This can be accomplished with quick acting hydraulic couplers. The drive connection is thus very simple and rapid to make.

As stated previously, the front housing 25 and pan 24 of the sweeping machine can be removed from the arms 26 and the pusher frame 117 installed in a matter of minutes. In addition to the stub pins 120 for connecting the pusher frame to the arms 26 a clamp 128 can be utilized to hold the frame in place on the arms.

The brush will be operated as in the form of the invention, by moving a valve to position to direct fluid under pressure to motor 67 and rotate the brush. As the street sweeping machine moves forward the brush will rotate and sweep material into a windrow deposited outside the trailing end of the brush. The brush mounted in this manner can be used for sweeping snow or for other jobs where the material does not have to be removed but merely placed in a windrow. The rotation of the brush is reversible by reversing the flow of fluid under pressure to the motor.

The brush angle can be reversed quickly through use of the swinging arm and releasable connector links. The unit can be adapted to any sweeping job.

FIG. 10 illustrates a further modification of the device of the invention wherein a hydraulic drive motor 135 is mounted partially within a tubular core member 136 of an implement and has an output shaft 137 that is drivably mounted in a flange 138 that is fixed to the core member 136.

The hydraulic motor 135 is of modified design, having a manifold portion 140 at a rear end thereof that mates with a manifold 141 of a support arm 142. Inlet and outlet hydraulic conduits 143 and 144 respectively are provided within the support arm 142 and these align with inlet and outlet openings in the hydraulic motor. The motor may be attached to support arm 142 with cap screws 145 and a support plate 146.

An end plate 149 is fixed to arm 142 and has an annular slinger ring 150 that overlaps the end portion of the tubular core member 136 to prevent entry of dirt and foreign material into the core. The motor 135 extends through a provided hole 148 into the interior of the core.

As can be seen, the hydraulic motor 135 extends only partially into the chamber of the core member. However, the drive shaft of the motor is protected from damage and the overall width of the unit is not increased.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. The combination with a sweeping machine having a frame *including an implement housing with a pair of end walls* a pair of *pinstable* support members, means for mounting said support members on said frame *closely adjacent said housing end walls,* and a tubular member rotatably mounted between said support members for rotation about the longitudinal axis of the tubular member, of:

a drive mechanism for rotating said tubular member, said drive mechanism including:

a source of *fluid* power in a form capable of being transmitted by conduit means, a motor fixedly attached to a first of said support members, said motor having an output shaft and being capable of utilizing power from said source to rotate said output shaft, said motor being located substantially within the interior chamber defined by said tubular member, drive means connected between said output shaft for driving said tubular member and supporting a first end of said tubular member,

*fluid* conduit means connected between said power source and said motor, and control means to control the transmission of power through said conduit means to said motor.

2. The combination as specified in claim 1 wherein said source of power is a source of fluid under pressure and said motor is a fluid motor.

3. The combination with a frame movable over a supporting surface, and a pair of support arms attached to said frame, of:

a source of fluid under pressure on said frame, a fluid motor fixedly attached to a first of said support arms, said motor having an output shaft and being capable of utilizing said fluid under pressure to rotate said output shaft under power, a drive flange drivably mounted on the output shaft of said fluid motor, a tubular implement drivably mounted in surrounding relationship to the drive flange adjacent a first end thereof and rotatably mounted on a second of said arms at a second end thereof, conduit means connected between said source of fluid under pressure and said fluid motor *said conduit means including passageways in said support arms,* and control valve means located in said conduit means to selectively control the flow of fluid under the pressure from said source to said motor, said motor being located at least partially within the interior chamber defined by said tubular implement.

[4. The combination as specified in claim 3 wherein said support arm to which said motor is attached has passageways therein constituting portions of said conduit means.]

5. The combination with a power sweeping machine having a main frame and support means comprising first and second arms on said frame, of:

a source of fluid under pressure, a fluid motor fixedly mounted on a first of said support arms and having an output shaft rotatable under power when said motor receives fluid under pressure, a tubular implement drivably mounted on and supported by said output shaft of said fluid motor at a first end thereof and rotatably mounted on a second of said arms at a second end thereof, said motor being mounted substantially within the interior chamber defined by said tubular implement, *means for adjusting the orientation of said tubular implement so that the axis of said tubular implement may be selectively positioned in opposite angular directions with respect to the direction of travel of said machine,* conduit means open from said source of fluid under pressure to said fluid motor, and control valve means located in said conduit means and adapted to selectively control flow of fluid under pressure from said source to said fluid motor.

6. The combination as specified in claim 5 wherein said second arm is substantially planar and said first arm is L-shaped, one of the legs of said L-shaped arm projecting inwardly into the interior chamber defined by said tubular implement, said fluid motor being fixedly attached to the leg of said arm that extends into said chamber of said tubular implement.

7. The combination of specified in claim 5 wherein said support arms are mounted on said sweeping machine through independent means comprising a pusher frame mounted on said main frame and extending forwardly from said power sweeping machine, and means for pivotally mounting said support arms to said pusher frame.

8. The combination with a prime mover having a main frame and adaptable to be propelled along a supporting surface, of:

a pusher frame mounted with respect to said main frame ahead of said prime mover, a pair of support arms, means for pivotally mounting said support arms on said pusher frame, a substantially cylindrical implement having a central tubular core member rotatably mounted with respect to, and between said support arms for rotation about the longitudinal axis of said tubular core member, a source of fluid under pressure mounted on said prime mover, a fluid motor fixedly mounted with respect to one of said support arms and having an output shaft rotatable under power when said motor receives fluid under pressure, said motor being mounted within the interior chamber defined by said tubular core member, drive means connected between said output shaft of said fluid motor and said tubular core so that when said output shaft is rotated said implement will rotate about its longitudinal axis, said pusher frame including adjustable mounting mechanism so that the axis of said tubular core member can be selectively positioned in opposite angular directions with respect to the direction of travel of said prime mover, flexible conduit means open from said source of fluid under pressure to said fluid motor, said conduit means being of sufficient length and flexibility to permit the angular position of said implement to be changed without disconnecting said conduit means, and control valve means located in said conduit means and adapted to selectively control flow of fluid under pressure from said source to said fluid motor.

9. The combination as specified in claim 8 wherein said implement is a cylindrical powered brush.

*10. The combination with a sweeping machine adapted to move over a surface to be swept comprising:*

*a frame including implement housing means;*

*first and second support members;*

*means for pivotally mounting said first and second support members to said frame housing in spaced apart relationship, said first and second support members being pivotable vertically away from said surface to be swept; and*

*a tubular implement member rotatably mounted between said first and second support members for rotation about the longitudinal axis of the tubular member, of:*

*a drive mechanism for rotating said tubular member, said drive mechanism including:*

*a source of power in a form capable of being transmitted by a conduit means;*

*a motor fixedly attached to said first support member;*

*said motor having an output shaft and being capable of utilizing power from said source to rotate said output shaft;*

*said motor being located substantially within the interior chamber defined by said tubular member;*

*drive means connected between said output shaft for driving said tubular member and supporting a first end of said tubular member;*

*conduit means connected between said power source and said motor;*

*said conduit means being at least partially flexible to allow pivotable movement of said first and second support members;*

*control means to control the transmission of power through said conduit means to said motor; and*

*means connected to raise and lower said first and second support arms and the axis of said tubular member.*

*11. A power driven sweeper comprising:*

*a frame member mounted on support wheels and at least one drive wheel and adapted to move over a surface to be swept, said frame member including a brush housing;*

*first and second support members;*

*means for pivotally mounting said first and second support members in said brush housing in spaced apart relationship, said first and second support members being pivotable within said housing for movement vertically away from said surface to be swept;*

*a cylindrical brush member rotatably mounted between said first and second support member for rotation about the longitudinal axis of the brush member;*

*a source of fluid under pressure on said frame;*

*a motor fixedly attached to said first support member;*

*said motor having an output shaft and being capable of utilizing said fluid under pressure to rotate said output shaft under power;*

*said motor being located substantially within the interior chamber defined by said brush member;*

*conduit means connected between said source of fluid under pressure and said motor, said conduit means being at least partially flexible to allow pivotable movement of said first and second support members;*

*control means connected to control the flow of fluid under pressure through said conduit means to said motor independent of any drive to said sweeper; and*

*means connected to raise and lower said first and second support arms and the axis of said brush member.*

*12. A power driven sweeper comprising:*

*a frame member mounted on support wheels and at least one drive wheel and adapted to move over a surface to be swept;*

*first and second support members each having first and second ends, the second end of said first support member having a protrusion extending inwardly of said sweeper generally transversely at said sweeper;*

*means for pivotally mounting the first ends of each of said first and second support members to said frame in spaced apart relationship, said first and second support members being pivotable vertically away from said surface to be swept;*

*a cylindrical brush member having a central tubular core member rotatably mounted between said first and second support members for rotation about the longitudinal axis of the brush member, the protrusion of said first support member extending into said control tubular core member;*

*a source of fluid under pressure on said frame;*

*a motor fixedly attached to the protrusion of said first support member;*

*said motor having an output shaft and being capable of utilizing said fluid under pressure to rotate said output shaft under power;*

*said motor being located at least partially within the interior chamber defined by said tubular core member;*

*drive means connected between said output shaft for supporting a first end of said brush member and for driving said brush member;*

*conduit means connected between said source of fluid under pressure and said motor, said conduit means being at least partially flexible to allow pivotable movement of said first and second support members;*

*control means connected to control the flow of fluid under pressure through said conduit means to said motor independent of any drive to said sweeper; and*

*means connected to raise and lower said first and second support arms and the axis of said brush member.*

*13. The combination with a sweeping machine comprising:*

*a frame;*

*a pair of support members;*

*means for mounting said support members on said frame; and*

*a tubular member rotatably mounted between said support members for rotation about the longitudinal axis of the tubular member, of:*

*a drive mechanism for rotating said tubular member, said drive mechanism including:*

*a source of power in a form capable of being transmitted by conduit means;*

*a motor fixedly attached to a first of said support members;*

*said motor having an output shaft and being capable of utilizing power from said source to rotate said output shaft;*

*said motor being located at least partially within the interior chamber defined by said tubular member;*

*conduit means connected between said power source and said motor;*

*control means to control the transmission of power through said conduit means to said motor;*

*drive means connected between said output shaft for driving said tubular member and supporting a first end of said tubular member, said drive means including:*

*an internal flange attached to said tubular member within said interior chamber; and*

*an internal drive member mounted on the output shaft of said motor, said shaft extending through and directly driving said flange.*

* * * * *

UNITED STATES PATENT AND TRADEMARK OFFICE

CERTIFICATE OF CORRECTION

PATENT NO. : Re. 29,957
DATED : April 10, 1979
INVENTOR(S) : Joseph G. Kasper

It is certified that error appears in the above-identified patent and that said Letters Patent are hereby corrected as shown below:

Claim 1, line 3, change "pinstable" to --pivotable--.

Signed and Sealed this

*Twenty-fourth* Day of *July 1979*

[SEAL]

*Attest:*

LUTRELLE F. PARKER

*Attesting Officer* *Acting Commissioner of Patents and Trademarks*